United States Patent [19]
Kabay et al.

[11] Patent Number: 5,949,871
[45] Date of Patent: Sep. 7, 1999

[54] METHOD AND APPARATUS FOR PROVIDING A SERVICE IN A SWITCHED TELECOMMUNICATIONS SYSTEM WHEREIN A CONTROL MESSAGE IS ALTERED BY A RECEIVING PARTY

[75] Inventors: Salih Kabay; Douglas John Carson, both of Edinburgh; James Robertson Galloway, Scone; Peter John Mottishaw, South Queensferry, all of United Kingdom

[73] Assignee: Hewlett-Packard Company, Palo Alto, Calif.

[21] Appl. No.: 08/803,300

[22] Filed: Feb. 20, 1997

[30] Foreign Application Priority Data

Feb. 20, 1996 [GB] United Kingdom ............... 96 03 591
Feb. 26, 1996 [GB] United Kingdom ............... 96 04 379
Jun. 7, 1996 [GB] United Kingdom ............... 96 11 935

[51] Int. Cl.$^6$ ............................. H04M 7/00; H04L 12/28
[52] U.S. Cl. ...................... 379/229; 379/230; 379/207; 379/220; 370/389
[58] Field of Search ..................... 379/229, 230, 379/207, 201, 220, 211, 219, 221; 370/389, 410, 426

[56] References Cited

U.S. PATENT DOCUMENTS

| | | | |
|---|---|---|---|
| 5,546,398 | 8/1996 | Tucker et al. | 370/94.1 |
| 5,550,914 | 8/1996 | Clarke et al. | 379/230 |
| 5,572,579 | 11/1996 | Orriss et al. | 379/230 |
| 5,586,177 | 12/1996 | Farris et al. | 379/230 |
| 5,598,464 | 1/1997 | Hess et al. | 379/230 |
| 5,602,909 | 2/1997 | Carkner et al. | 379/230 |
| 5,625,681 | 4/1997 | Butler, II | 379/230 |

FOREIGN PATENT DOCUMENTS

| | | |
|---|---|---|
| 0 549 127 A2 | 6/1993 | European Pat. Off. . |
| 0 669 771 A1 | 8/1995 | European Pat. Off. . |
| 0 708 570 A2 | 4/1996 | European Pat. Off. . |
| 0 710 042 A2 | 5/1996 | European Pat. Off. . |
| WO 95/35633 | 12/1995 | WIPO . |

OTHER PUBLICATIONS

Jabbari, "Common Channel Signalling System Number 7 for ISDN and Intelligent Networks", Proc. IEEE, V 79, Feb. '91, pp. 166–169.

EPO Search Report EP 97 30 0799.

*Primary Examiner*—Harry S. Hong
*Assistant Examiner*—Benny Q. Tieu

[57] ABSTRACT

A method of providing a service, such as local number portability (LNP), in a switched telecommunications system, in which a message interceptor is disposed in a signalling link of an SS7 signalling network of the system. The message interceptor detects calls for which service implementation is required, by comparing the content of intercepted circuit-related SS7 messages with service trigger conditions, such as message type (checked directly by the interceptor) and message content (e.g. called number, which the interceptor checks by reference to a database). When service implementation is detected as being required, the message interceptor may implement at least part of the required service by modifying parameters of the intercepted message; alternatively, the interceptor may re-direct the message to a service control function for service implementation. The invention enables services to be implemented without incurring inefficient use of core network resources, and without expensive and time-consuming modification of switch and SCP control software.

12 Claims, 13 Drawing Sheets

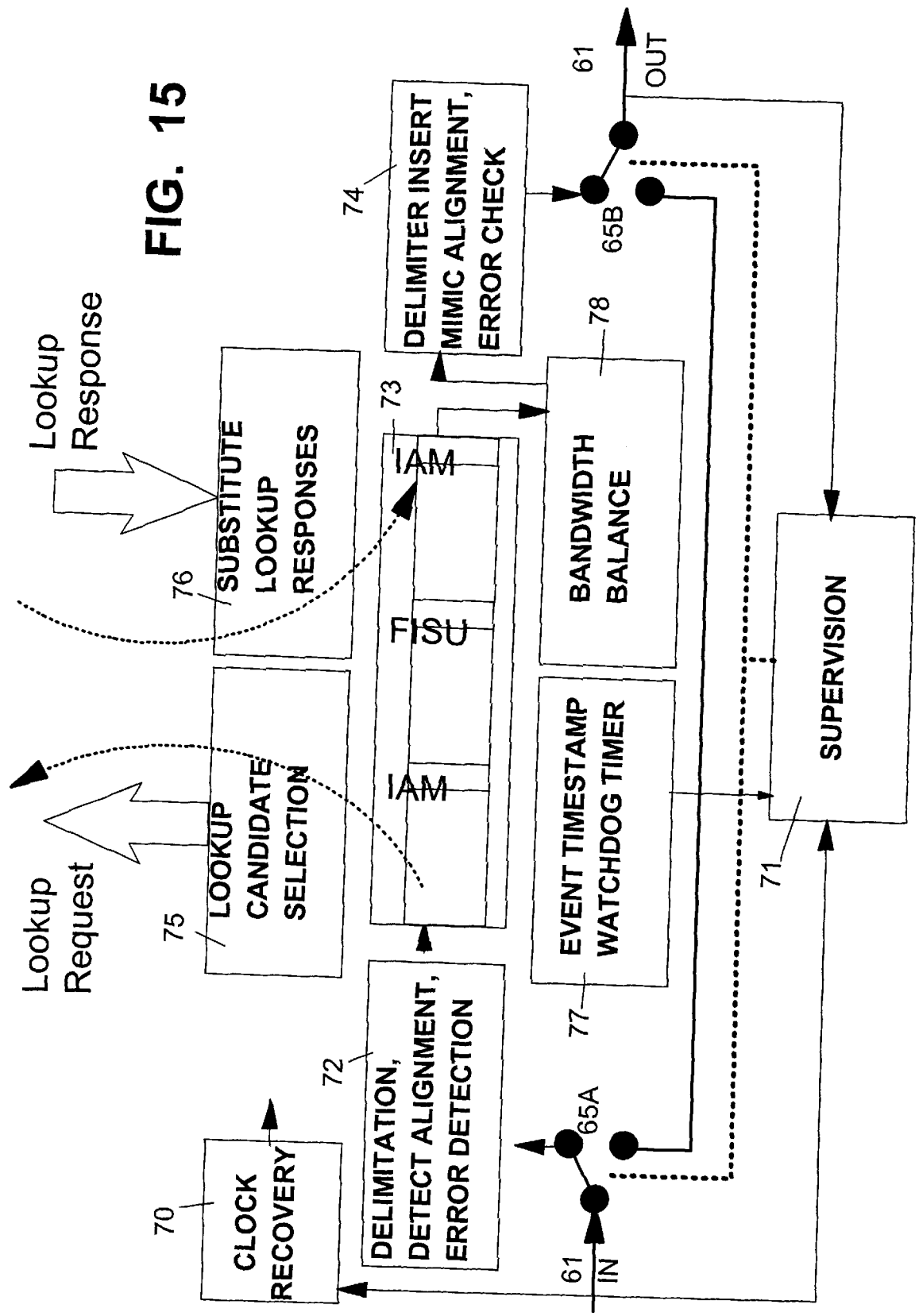

METHOD AND APPARATUS FOR PROVIDING A SERVICE IN A SWITCHED TELECOMMUNICATIONS SYSTEM WHEREIN A CONTROL MESSAGE IS ALTERED BY A RECEIVING PARTY

TECHNICAL FIELD

The present invention relates to a method of providing a service in a switched telecommunications system and a message interceptor suitable for use in this method. In particular, but not exclusively, the present invention relates to a service providing method and message interceptor for use in a switched telecommunications system having a signalling network operating substantially in accordance with Signalling System No.7, whether as specified by the CCITT, ANSI, ETSI (for GSM), Bellcore or similar body, such a network being herein referred to as an SS7 network. The CCITT Signalling System Number 7 is specified in Recommendations Q.700-Q.716 CCITT Volume VI—Fascicle VI.7, Geneva 1989, ISBN 92-61-03511-6 which is herein incorporated by reference.

BACKGROUND OF THE INVENTION

Signalling in Modern Telecommunications Systems

In modern switched telecommunication systems (in particular, modern PSTNs) it has become common practice to provide two related but separate network infrastructures: a bearer or transmission network for carrying end-user voice and data traffic, and a signalling network for controlling the setup and release of bearer channels through the bearer network in accordance with control signals transferred through the signalling network. In practice such signalling networks comprise high-speed computers interconnected by signalling links; computer programs control the computers to provide a set of operational and signalling functions in accordance with a standardized protocol. One example of such a signalling protocol is the afore-mentioned Signalling System No. 7 (SS7) which is being extensively deployed for control of telephone and other data transmission networks. An SS7 network basically comprises various types of signalling points, namely, signalling end points (SEPs) and signalling transfer points (STPs) interconnected by signalling links, the SEPs being associated for example with respective service switching points (SSPs) of the transmission network, and with service control points (SCPs).

Referring to FIG. 1, an SS7 network 10 is shown intercommunicating three signalling end points constituted by two service switching points SSPs 11 (between which extend speech circuits 12 of a transmission network not further illustrated) and a service control point SCP 13. The SCP serves to implement particular services (sometimes called IN, or Intelligent Network, services) in response to service requests received from an SSP, such a service request being generated by an SSP upon certain trigger conditions being met in the SSP in respect of a call that it is handling. A typical service may involve the translation of the dialled number (called party number) to a different number, the SCP returning this latter number to the SSP to enable the latter to complete call setup.

The SS7 network 10 includes two pairs 14 of signalling transfer points STPs, and a plurality of link sets 18 interconnecting the SSPs, SCP and STPs into a redundant network. Each signalling link set 18 is made up of one or more individual signalling links, the number of signalling links in a link set being chosen to provide appropriate capacity for the level of signalling traffic expected. The redundancy provided in respect of the STPs and links is to ensure that the failure of a single component of the network core does not cause the whole network to fail.

It should be noted that an SS7 network will typically comprise more STP pairs, SSPs and SCPs than illustrated. Service control functionality, as well as being provided in an SCP, can be provided in an Adjunct directly connected to an SSP.

Messages traversing the links of the network may be any of a large number of different types, depending on the nature of the call to which the message relates and the function specified by the message.

The SS7 Architecture

In order to facilitate an understanding of the present invention, a brief review will be given of the layered structure of the SS7 architecture and of the messages passed over the links of the network 10 to implement the SS7 architecture.

FIG. 2 illustrates the SS7 architecture. Levels 1 to 3 (referenced 21, 22, 23) form the message transfer part (MTP) 24. The MTP 24 is responsible for transferring signalling information between signalling points in messages. Level 4 (not referenced as a whole) comprises circuit-related user parts, namely ISDN User Part (ISUP) 26 and Telephone User Part (TUP) 27. These user parts define the meaning of the messages transferred by the MTP 24 and provide functionality to the users of SS7 (block 29). The user parts 26 and 27 are specific to particular types of circuit-related applications as indicated by their names. In fact, the ISUP is the most important user part, the TUP being a subset of ISUP and having been largely replaced by the latter. Most inter-exchange signalling, such as between SSPs 11 in FIG. 1, uses ISUP messages.

SS7 level 4 also includes functional elements defining a general protocol for non-circuit-related information, such as operations, maintenance and administration information or network database information (provided, for example, from an SCP 13). The main functional element in this Level 4 protocol is the Transaction Capabilities (TC) 30 which sits on top of a Signalling-Connection-Control Part (SCCP) 31 and beneath a TC Users element 32. The SCCP 31 actually forms part of the transfer mechanism for non-circuit-related applications, combining with MTP 24 to provide a transfer mechanism meeting the Open Systems Interconnection (OSI) Layer 3/4 boundary requirements. Users of the SCCP/TC stack include the INAP (Intelligent Network Application Part) 32 and MAP (Mobile Application Part) 33. With reference to FIG. 1, messages passed between an SSP 11 (FIG. 1) and SCP 13 will be INAP messages using SCCP/TC. Some inter-exchange signalling may also use SCCP/TC messages where, for example, the purpose of the signalling is service related rather than circuit related. ISUP may also use the SCCP for certain messages.

Considering the MTP 24 in a little more detail, Level 1 (reference 21) defines the physical, electrical and functional characteristics of the transmission path for signalling. MTP Level 2 (reference 22) defines the functions and procedures for the transfer of signalling messages over a link between two directly-connected signalling points. MTP Level 3 (reference 23) provides functions for the reliable transfer of signalling information from one signalling end point to another. Thus, Level 3 is responsible for those functions that are appropriate to a number of signalling links, these being separable into signalling-message handling functions and signalling-network management functions.

When considering the passing of messages over a single link, it is the combination of Levels 1 and 2 that provides for the reliable transfer of signalling information. The Level 2 functions provide a framework in which the information is transferred and performs error-detection and error-correction processes; the Level 2 functions are carried out afresh on a link-by-link basis. At Level 2, information is seen as being transferred between signalling points in messages known as "signal units".

The general form of a signal unit 40 is shown in FIG. 3. As can be seen, a field 41 carrying message/data is encapsulated in a Level 2 framework comprising the following fields: a flag field; a backward sequence number field (BSN); a backward-indicator bit (BIB); a forward sequence number field (FSN); a forward-indicator bit (FIB); a length indicator field (LI); a spare field (SP); a check field; and a terminating flag field. The bit lengths of these fields are also indicated in FIG. 3. The FSN, FIB, BSN, BIB and check fields provide error correction functionality at link level in a manner well understood by persons skilled in the art.

There are three types of signalling unit:

MSU—the Message Signal Unit—MSUs carry all service/application data sent on the SS7 network. The amount of data per MSU is limited to 273 octets maximum.

LSSU—the Link Status Signal Unit—LSSUs carry information relating to the status of the link and are therefore concerned with Level 2 functions. Normally, LSSUs are only seen during the initial alignment procedure when a link is brought into service but are used at other times, for example, to stop the flow of signal units when processors are busy.

FISU—the Fill-In Signal Unit—When no MSUs or LSSUs are to be sent, a signalling point continually sends FISUs. FISUs carry basic Level 2 information only, for example, the acknowledgement of the last MSU (field 41 is empty).

The length indicator (LI) within each message indicates the signal unit type as follows: LI=0 means FISU; LI=1 or 2 means LSSU; and LI=3 or more means MSU.

FIG. 3 further illustrates at 42 the basic format of an MSU; as can be seen, it comprises a service information octet SIO of 8 bits and a signalling information field SIF of 8n bits, where n is a positive integer. The SIO field includes a Service Indicator sub-field that defines the user part or equivalent appropriate to the message. The SIF contains the information being transferred and will generally include a routing label 43 comprising a 14-bit destination point code (DPC) indicating the destination signalling end point, a 14-bit originating point code indicating the originating signalling end point, and a 4-bit signalling link selection field for specifying a particular link in cases where two signalling points are linked by a multiple-link link set. The MTP 24 is not aware of the contents of the SIF other than the routing label.

As an example of the information that may be borne by an MSU, where a call is being set up, the first ISUP message to be sent out by the calling-party exchange is an initial-address message (IAM) which will contain the required address (e.g. the digits dialled by the calling customer) and it results in a seizure of a circuit by each exchange along the route to the called-party exchange. FIG. 4 illustrates the general format of an ISUP message. Thus, an ISUP message comprises, in addition to the routing label 43, a circuit-identification code (CIC) 44 indicating the number of the speech circuit between two exchanges to which the message refers, a message type code 45 (set to 00000001 for an IAM), and a number of parameters organised into three parts 46, 47, 48 according to type. Mandatory parameters of fixed length are placed in the mandatory fixed part 46 (for an IAM, these are the Nature of Connection parameter, the Forward-call Indicators, the Calling Party Category parameter, and the Transmission Medium Requirement parameter). Mandatory parameters of variable length are placed in the variable mandatory part 47 (for an IAM, there is only one such parameter, namely the Calling-Party Number). Optional parameters are placed in the optional part 48 (for an IAM, these are the Calling-Party Number and User-to-User information).

Number Portability Service

The general process of service provision in a modern PSTN has already been outlined above, this process involving the generation by an SSP of a service request that is then passed to service control functionality (generally either in the form of an SCP or an Adjunct). To facilitate an understanding of the context of the present invention, a more specific example of a known service will next be described.

A service that is currently attracting much attention is number portability. The reason for this interest is that Local Number Portability (LNP) has become a regulatory requirement in the USA. LNP is intended to allow subscribers to move between LECs (Local Exchange Carriers) whilst retaining their existing telephone numbers, within a rating area.

AT&T has proposed an LNP solution using a Location Routing Number (LRN). This solution relies on switched-based triggers to reference service control functionality in standard manner. The solution requires modification to the ISUP IAM message to add in a Generic Address Parameter (GAP) and a Forward Call Indicator (FCI). The general operation of the LRN number portability proposal will become clear from the following description given with reference to FIG. 5.

In FIG. 5, party A is connected to switch EO1 of carrier C1 ("EO" standing, of course, for "End Office"). Party B was previously connected to switch EO2 of carrier C1 but has now ported (moved) to carrier C2 and is currently connected to switch EO3 of carrier C2. Before B ported to carrier C2, B's number was "708-444-1234", the "708-444" part of this number indicating the switch; when A dialled B, the switch EO1 simply routed the call direct to switch EO2 based on the "444" part of the dialled number. After B has ported, B is connected to switch EO3 which is identified by "708-555". The objective of number portability is to enable A to continue to dial B using the number "708-444-1234" (it being appreciated that the "708" part of the number will not need to be dialled by A). The operations that follow the dialling of "444-1234" by A will now be described, these operations being indicated by bracketed reference numbers in FIG. 5:

(1) EO1 examines the dialled digits and determines that the dialled number (DN) relates to switch EO2 which is a donor EO (that is, some subscribers have been ported from this EO). Of course, carrying out this determination requires that every switch must perform an internal lookup to determine whether the DN is destined for a donor EO.

(2),(3) An LNP SCP database lookup is now performed to determine if the Called Party Number CdPN is ported (typically, this query will be routed via an STP as illustrated).

(4),(5) The SCP returns an LRN. For non-ported customers the LRN will be the same as the original CdPN. However, if the customer has ported the LRN will be different from the original CdPN.

(6),(7) Assuming the DN is for a ported customer, then EO1 must route the call based on the LRN routing tables. The chosen route will generally be via an Access Tandem as the call is destined for a different carrier. Once a route is selected, switch EO1 prepares an IAM with the following substitutions: CdPN=LRN, GAP=DN and FCI=LNP Query Done. The IAM is then transmitted.

(8) When the IAM arrives at the recipient switch EO3, a check is performed on the FCI and GAP. This check indicates that the IAM relates to a ported customer and so EO3 must substitute CdPN=GAP and then perform a lookup on the CdPN to establish the physical connection to the CPE (Customer Premises Equipment).

As described, the above method relies on the originating switch (here EO1) querying a LRN database before initiating every call. Considering the small number of customers who are expected to port their numbers, this approach (the "originating trigger" method) results in highly inefficient use of valuable network resources. As an alternative, the originating switch can be arranged to attempt to terminate each call to the switch indicated in the dialled number DN; most calls will complete successfully and only in the event that a call fails because of a call attempt to a ported DN will a LRN database lookup be made. This second approach is referred to as the "call dropback" method as it involves a failed call being dropped or released back to the originating switch. There are two main versions of the call dropback method which differ in where the LRN lookup is done. In the first version, the donor switch (i.e. the switch where the ported number originally resided) does the lookup and passes back the LRN to the originating switch in an enhanced release message. In the second version, it is the originating switch that does the lookup after receiving a release message from the donor switch indicating that the DN has ported. Whilst either version of the call dropback method is relatively efficient in its use of resources, a user calling a ported customer experiences an increase in post-dial delay because two calls must be initiated before one is completed.

It will be appreciated that the above-described LNP methods require modification to the existing switch software as well as to the SCPs. Such modifications are often extremely expensive and time consuming. The same shortcomings are apparent for other new services it is desired to implement.

It is an object of the present invention to provide a method of implementing services in a switched telecommunications network that is less costly and has less effect on existing infrastructure than the standard method of implementation described above. A separate object of the present invention is to provide a simple message interceptor that can be used in the method of the present invention to intercept inter-exchange signalling messages.

SUMMARY OF THE INVENTION

According to the present invention, there is provided a method of providing a service in respect of a call in a switched telecommunications system that comprises a bearer network with a plurality of switching points for setting up calls through the bearer network, and a signalling system with a plurality of links by means of which circuit-related control messages can be passed between the switching points for regulating call setup and release; said method comprising the steps of:

(a)—intercepting said circuit-related control messages, (b)—for each intercepted control message, accessing service trigger data to ascertain whether service implementation action is required in respect of the call associated with the control message, (c)—where step (b) indicates that service implementation action is required, modifying the corresponding control message, and (d)—forwarding on the intercepted control messages over the signalling network.

According to another aspect of the present invention, there is provided a message interceptor for intercepting and modifying messages passing over a signalling link according to a link-level protocol operated between the link end points, said message interceptor effecting its operation without providing a link-level termination.

BRIEF DESCRIPTION OF THE DRAWINGS

Methods of providing a service in a switched telecommunications system, and a message interceptor, embodying the invention will now be described, by way of non-limiting example, with reference to the accompanying diagrammatic drawings, in which:

FIG. 7 is a diagram showing the operations involved in implementing number portability in a second embodiment of the invention, for a customer who has ported in;

FIG. 15 is a block diagram showing the main functional units of the message interceptor.

BEST MODE FOR CARRYING OUT THE INVENTION

Embodiments of the present invention relating to the provision of particular services will now be described with reference to FIGS. 6 to 12 of the accompanying drawings. All these embodiments utilise a message interceptor disposed in a signalling link of a PSTN that has an SS7 signalling network. The message interceptor serves to detect calls for which service implementation is required, this detection being done by comparing intercepted circuit-related signalling messages with service trigger conditions. These trigger conditions include message type which the message interceptor can generally check directly itself, and message content (such as called number) which the message interceptor may check by referencing a database. Once service implementation has been detected as required, two different approaches are possible. According to a first approach, the message interceptor not only serves to detect calls for which service provision is required, but also effects at least part of the service provision by modifying parameters of the intercepted messages. In the second approach, the message interceptor re-directs to a service control function those messages which it detects as calling for service implementation.

A preferred form of message interceptor is described with reference to FIGS. 13, 14 and 15.

Service Implementation Examples

Figure 1:
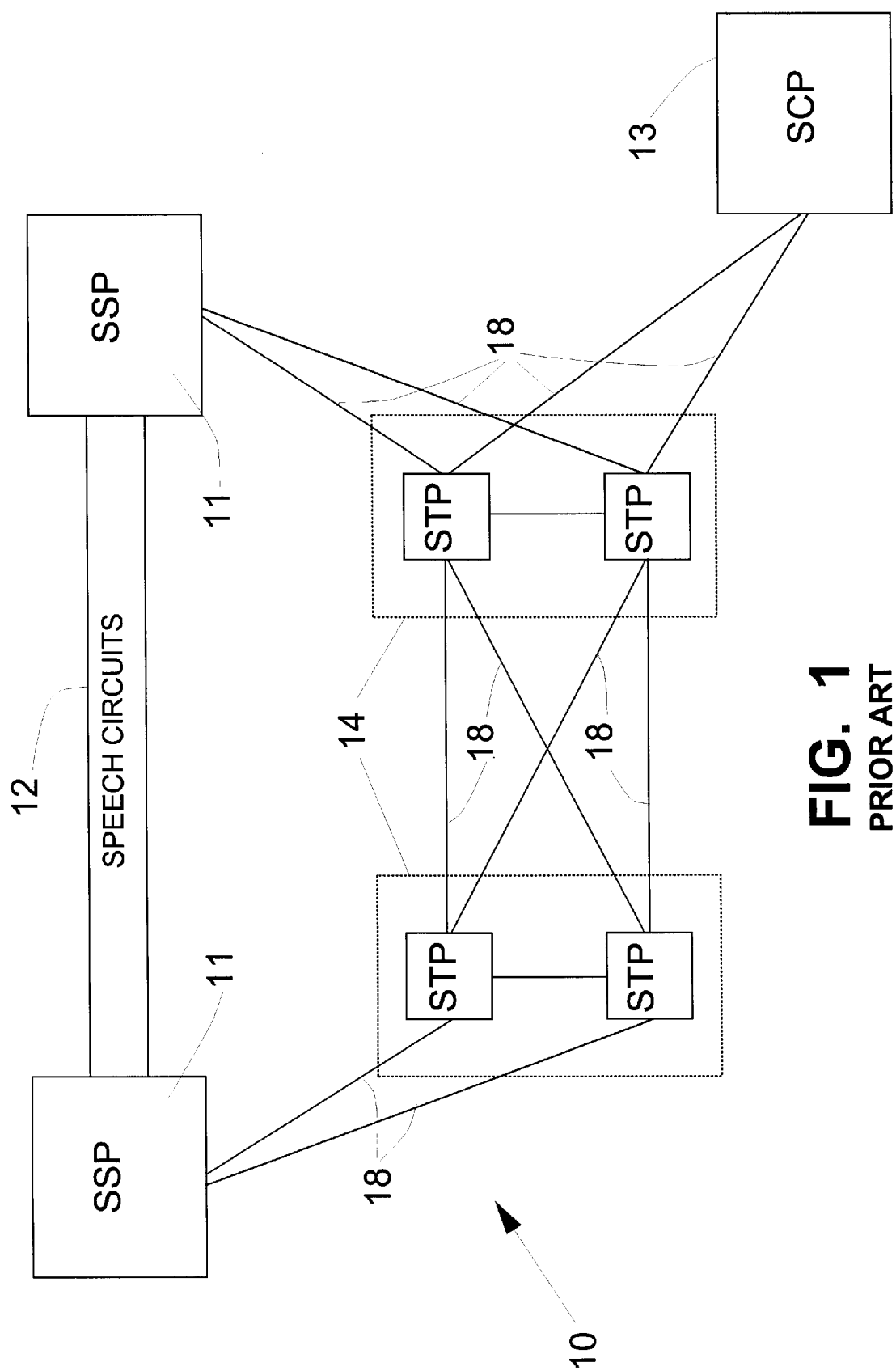
FIG. 1 is a diagram illustrating the main components of a standard SS7 signalling system.
Figure 2:
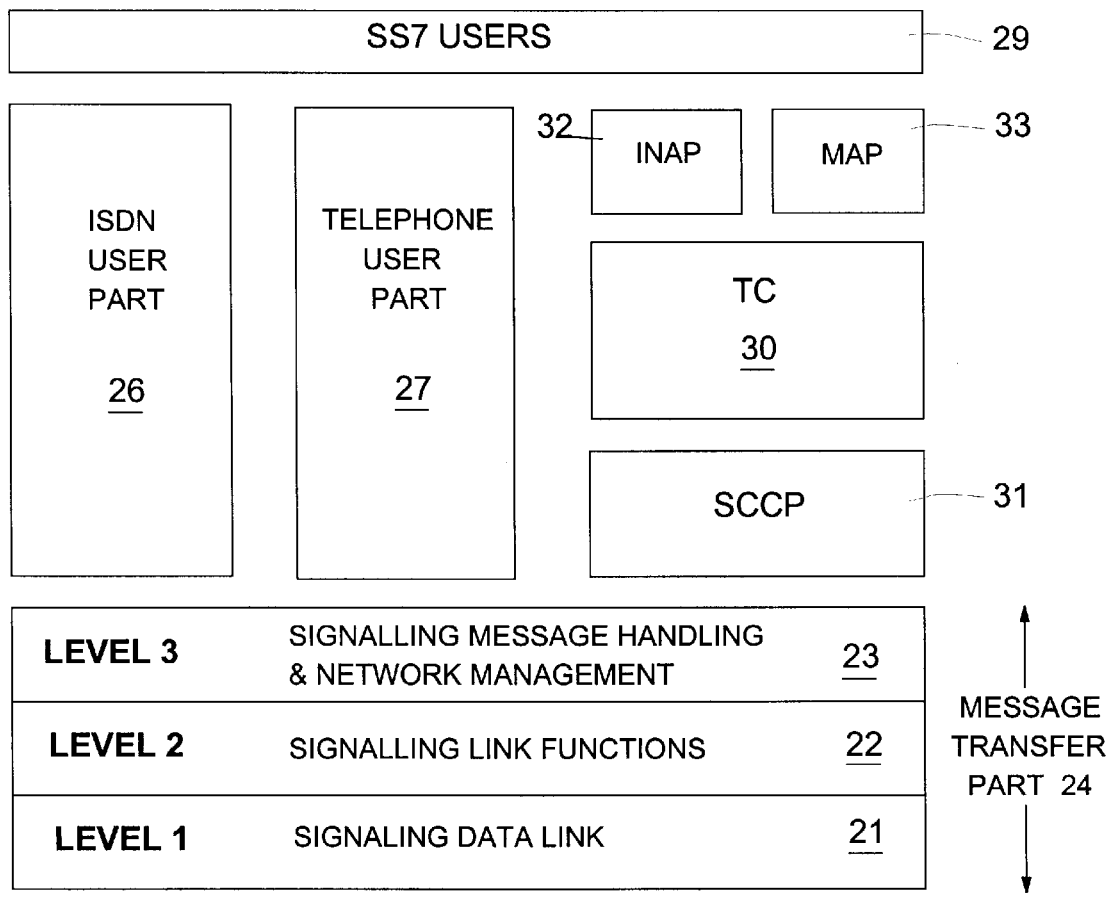
FIG. 2 is a diagram illustrating the basic architecture of the SS7 protocol.
Figure 3:
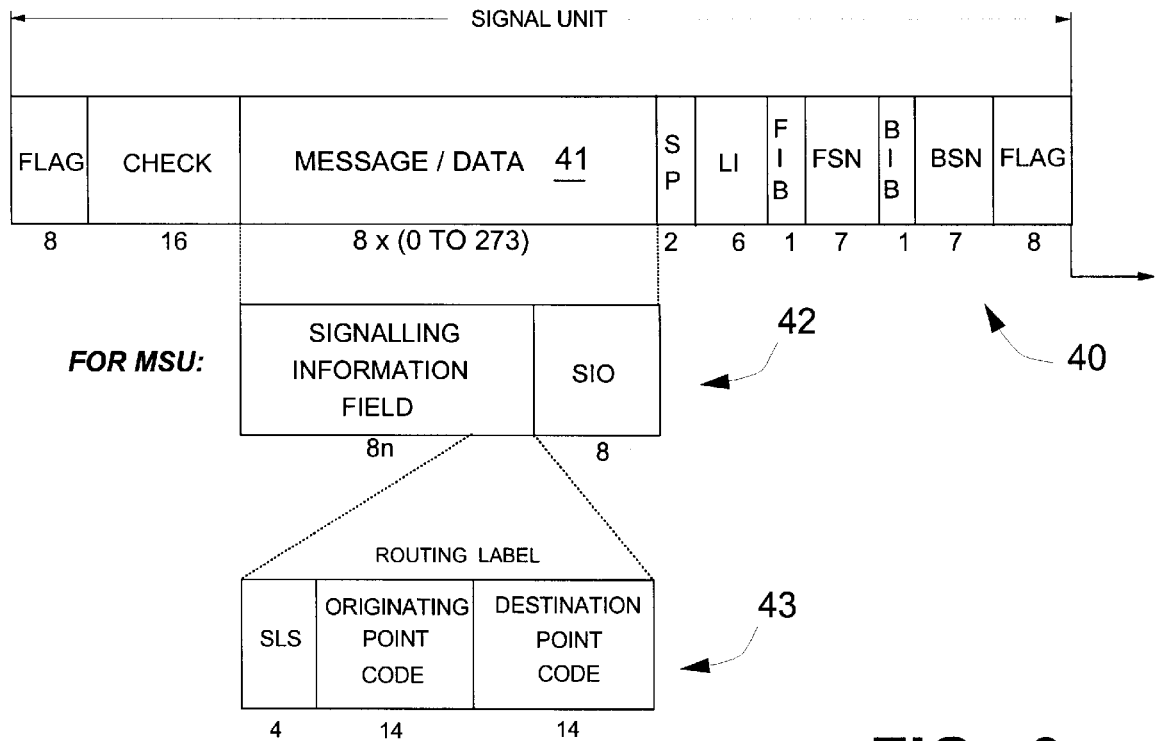
FIG. 3 is a diagram showing the format of an SS7 message signalling unit (MSU)
Figure 4:
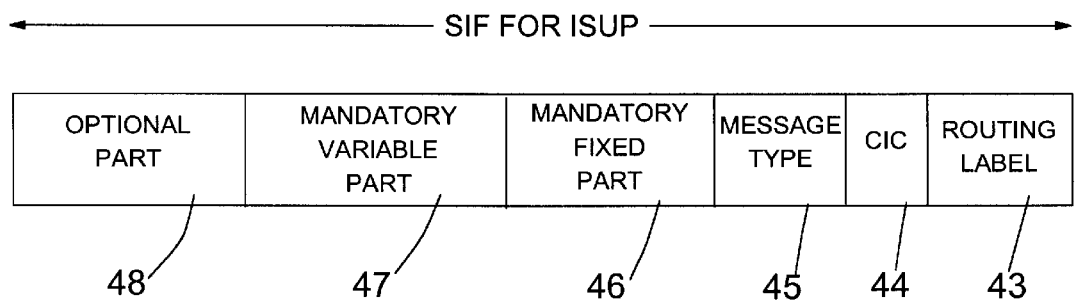
FIG. 4 is a diagram of the signalling information field of an ISUP MSU.
Figure 5:
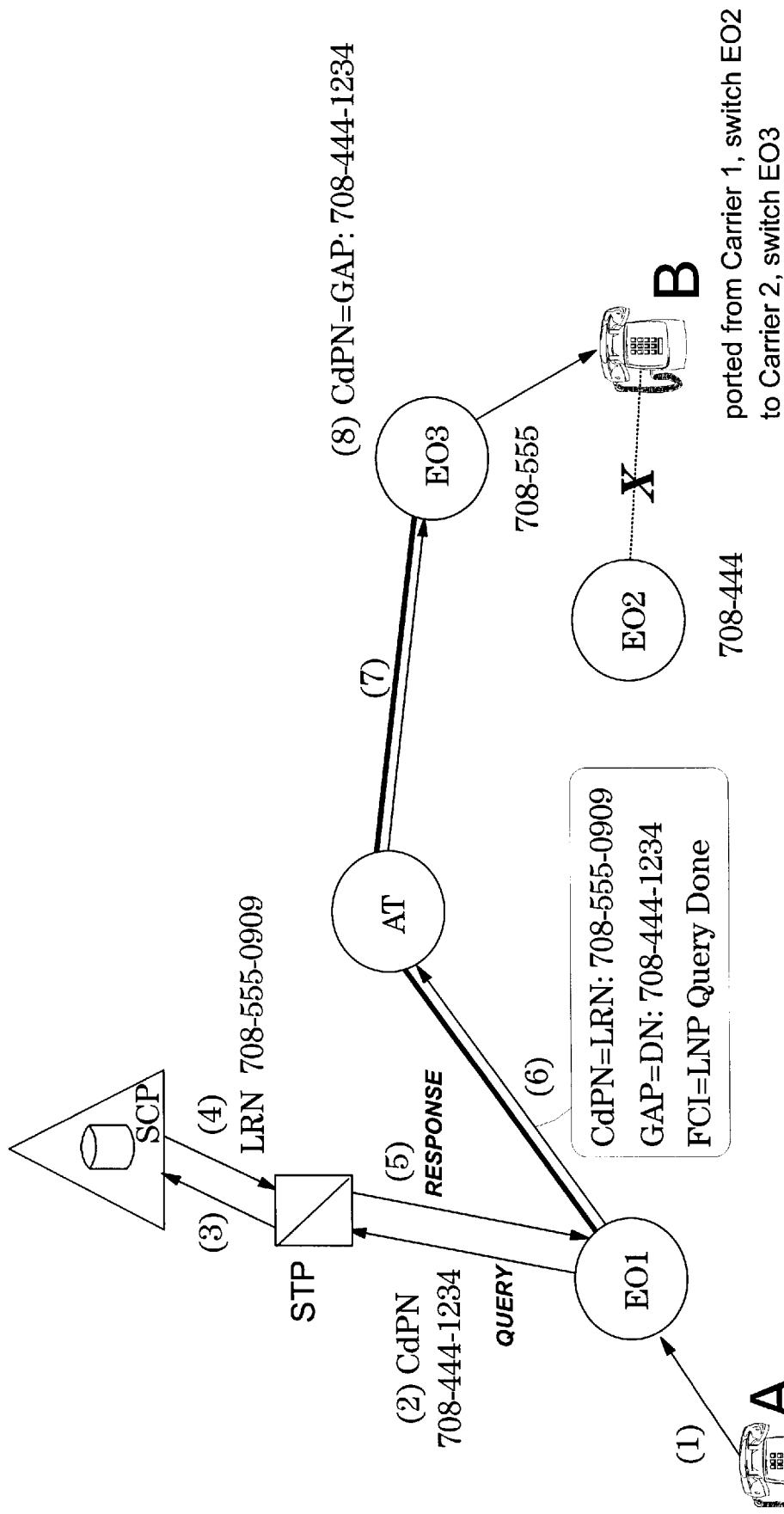
FIG. 5 is a diagram showing the operations involved in implementing the switch-based LRN number portability proposal described above.
Figure 6:
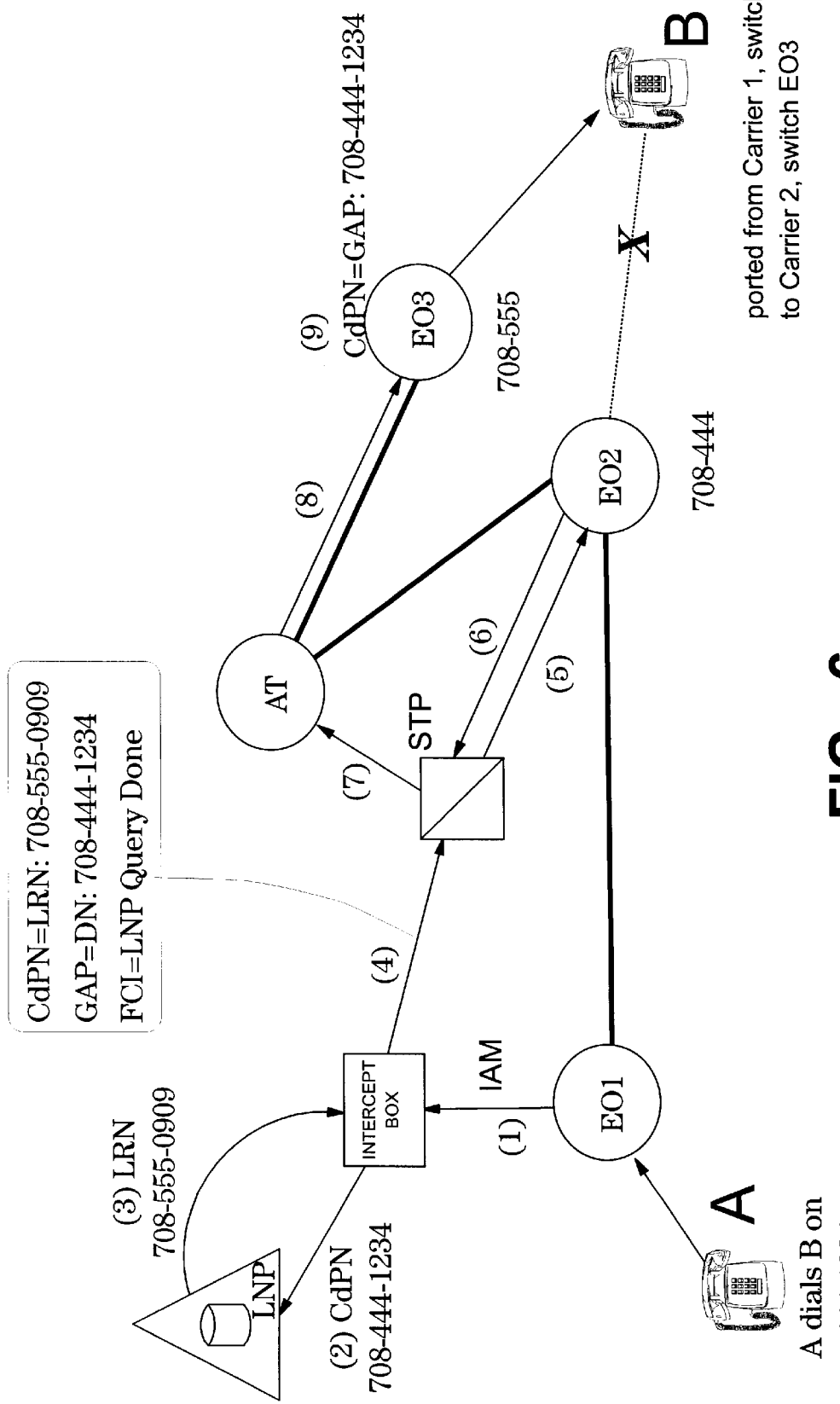
FIG. 6 is a diagram showing the operations involved in implementing number portability in a first embodiment of the invention, for a customer who has ported out.
Figure 7:
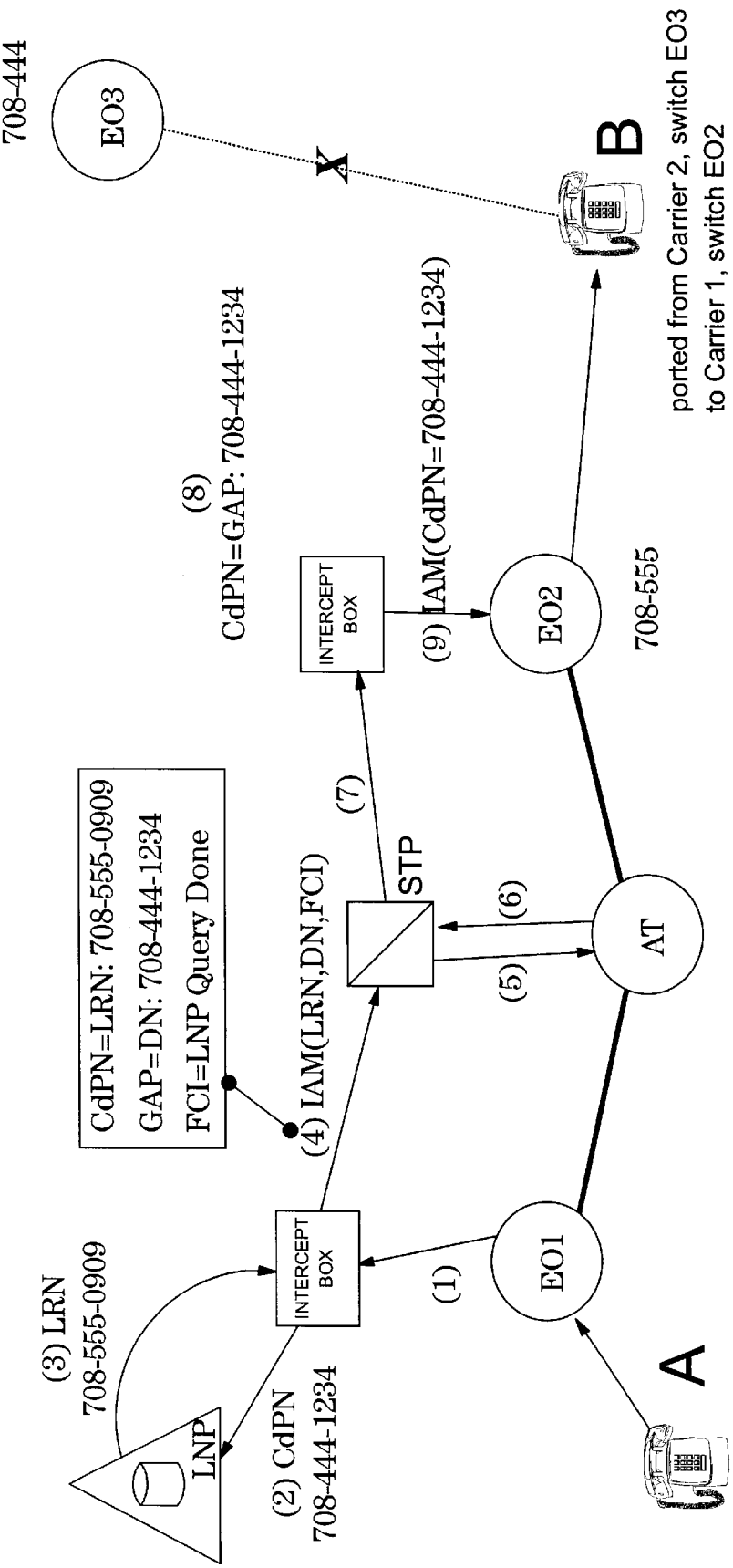
Figure 8:
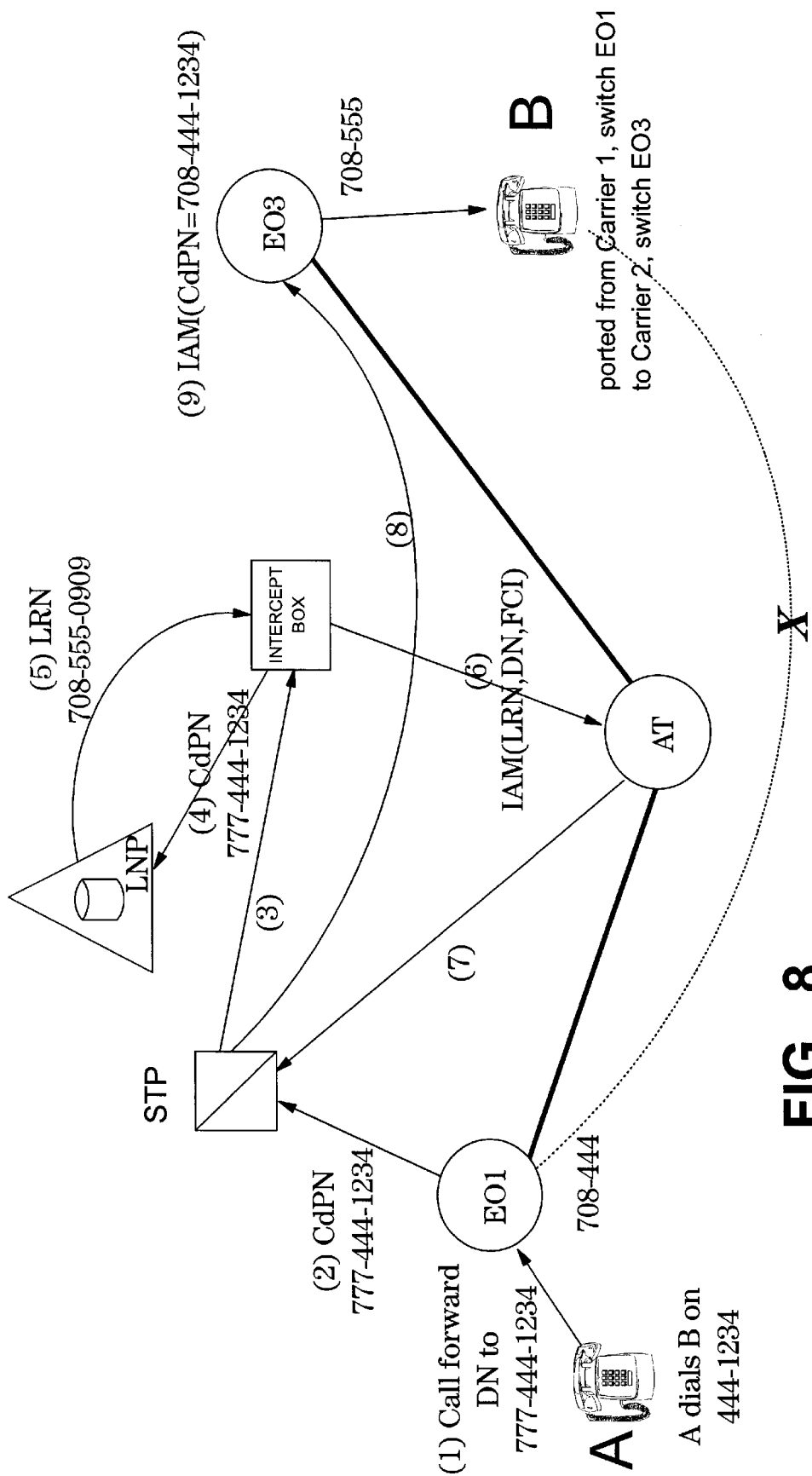
FIG. 8 is a diagram showing the operations involved in implementing number portability in a third embodiment of the invention, for a customer who has ported out from the same local exchange as a caller.
Figure 9:
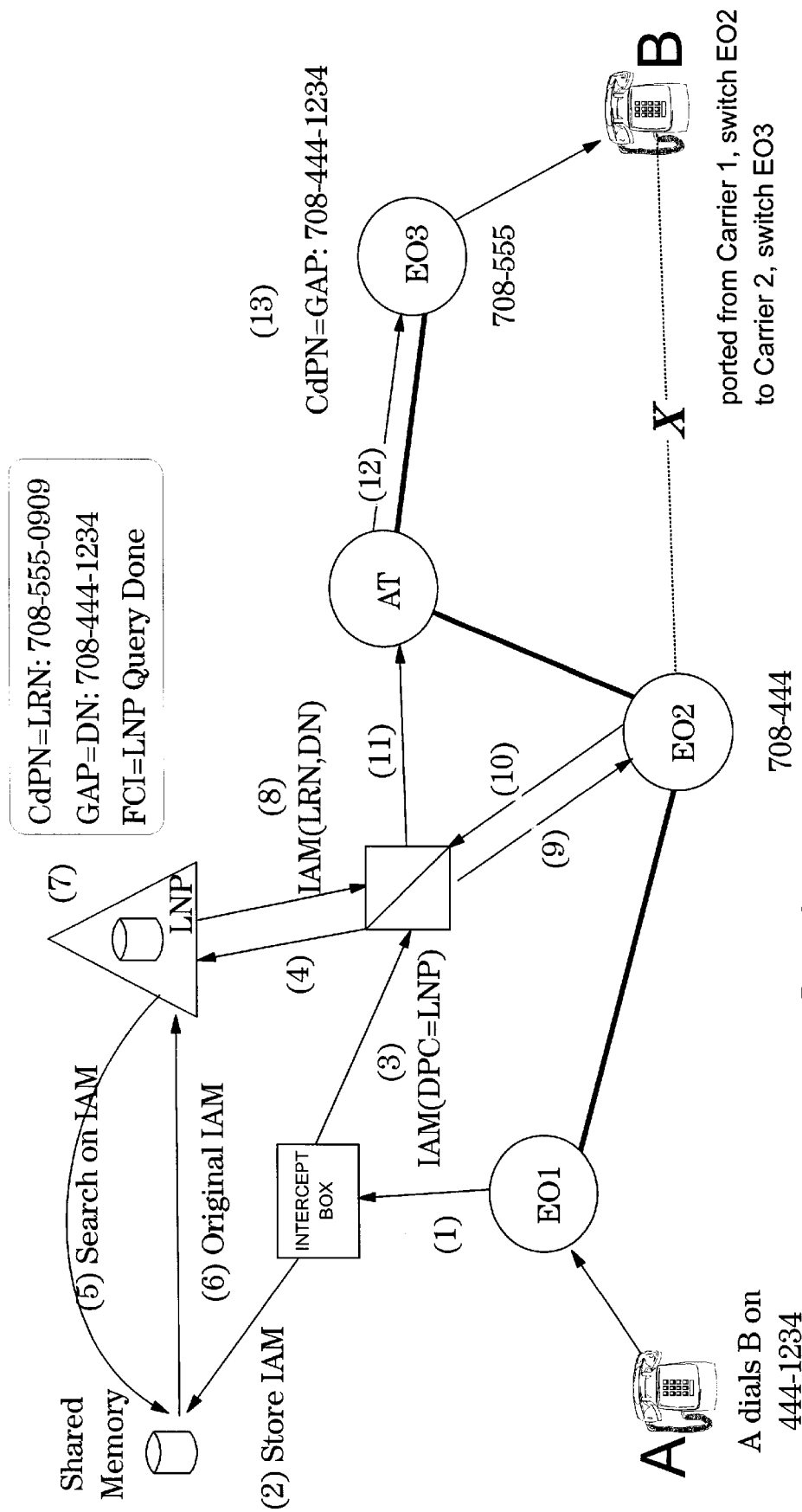
FIG. 9 is a diagram showing the operations involved in implementing number portability in a fourth embodiment of the invention, for a customer who has ported out.

The first service to be considered below is local number portability (LNP) effected using Location Routing Numbers. Four possible situations will be described with reference to FIGS. 6 to 9 as follows:

FIG. 6 Customer A calling Customer B who has ported out from carrier 1 to carrier 2;

FIG. 7 Customer A calling Customer B who has ported in from carrier 2 to carrier 1;

FIG. 8 Customer A calling Customer B who has ported out from the same local exchange as A (carrier 1) to carrier 2;

FIG. 9 Customer A calling Customer B who has ported out from carrier 1 to carrier 2.

The embodiments of FIGS. 6 to 8 all use the aforesaid first approach to service provision whereas the FIG. 9 embodiment uses the second approach. It will be appreciated that the second approach could also be used in other situations (e.g. those corresponding to FIGS. 7 and 8).

Figure 10:
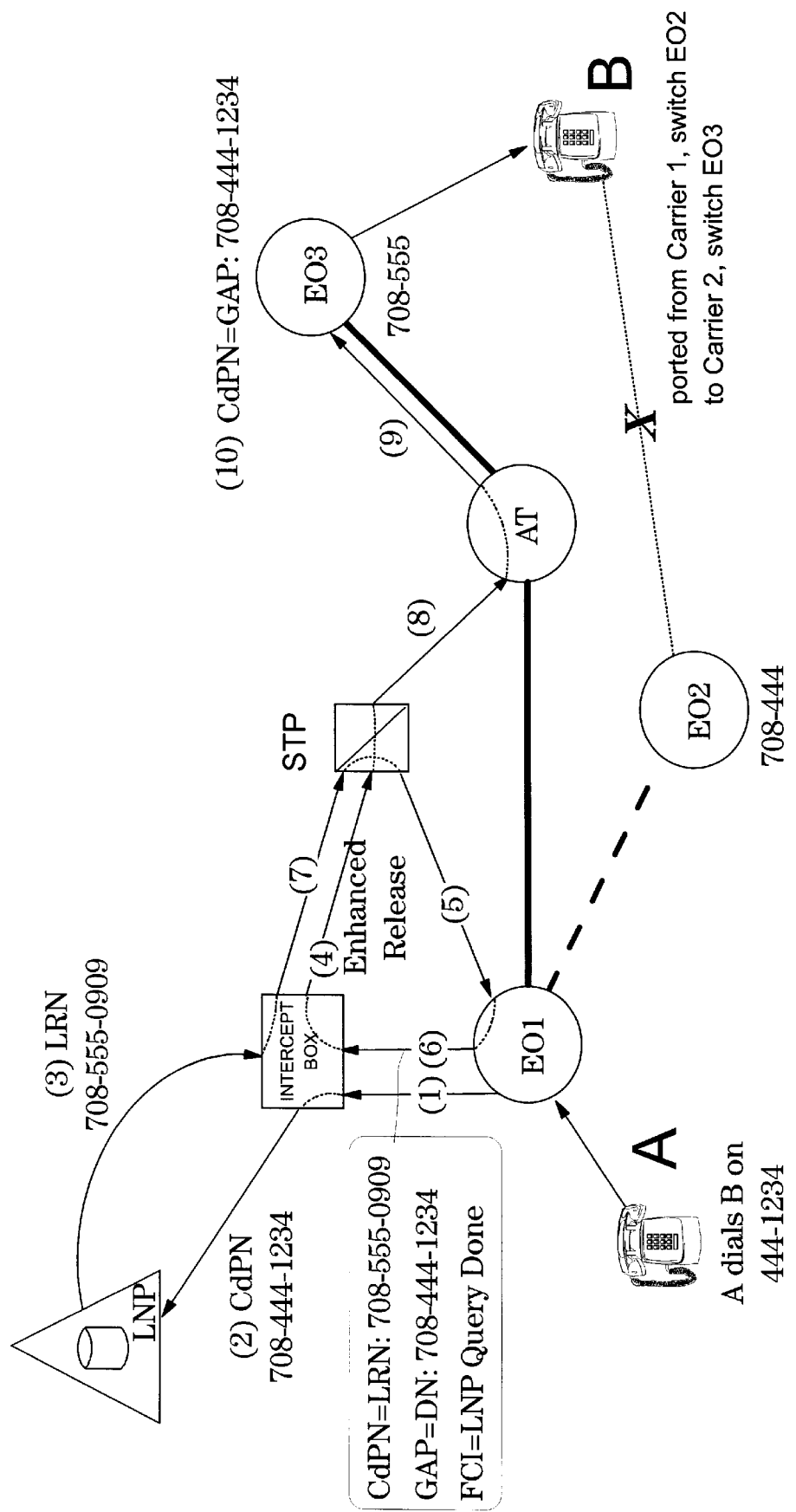
FIG. 10 is a diagram showing the operations involved in implementing number portability in a fifth embodiment of the invention, using enhanced release messages, for a customer who has ported out.

FIG. 10 illustrates a third approach according to the invention for providing LNP, this approach being similar to the call dropback method previously mentioned; FIG. 10 relates to the same situation as FIG. 6 but it will be appreciated that the variant method could equally be applied to the other situations described.

LNP—Customer B Ported-Out (FIG. 6)

Party A (EO1) is attempting to contact B who has now ported from carrier 1 (EO2) to carrier 2 (EO3). The objective is to deliver the call to party B on EO3 using the original carrier 1 number.

(1) EO1 simply launches an IAM to EO2 based on the DN received from party A. A speech path is set-up between EO1 and EO2.

(2) A message interceptor intercepts the MSU traffic from the links between EO1 and the STP. This is done on a per-link basis. For each IAM detected, an LNP database lookup is performed across a data network to determine if the Called Party Number (CdPN) is ported.

(3) The database returns an LRN. For non-ported customers the LRN will be the same as the original CdPN. However, if the customer has ported the LRN will be different from the original CdPN.

(4) Assuming the DN is for a ported customer, the message interceptor will substitute the LAM CdPN=LRN, GAP=DN and FCI=LNP Query Done and retransmit the MSU to EO2.

(5)–(8) When EO2 receives the IAM it will see a CdPN=LRN and attempt to complete the call via an Access Tandem. A speech path will be reserved across EO1-EO2-AT-EO3.

(9) When the LAM arrives at the recipient EO3, a check is performed on the FCI and GAP. Based on this, EO3 must substitute CdPN=GAP and perform a lookup on the GAP to establish the physical connection to the CPE.

LNP—Customer B Ported-In (FIG. 7)

Party A (EO1) is attempting to contact B (new carrier 1 customer) who has ported from carrier 2 (EO3) to carrier 1 (EO2). The objective is to deliver the call to party B on EO2 using the original carrier 2 number.

(1) Assuming that all calls to a foreign LEC (local exchange carrier) will transit through an Access Tandem (AT), EO1 simply launches an IAM to the AT based on the DN received from party A. A speech path is set-up between EO1 and AT.

(2) A message interceptor intercepts the MSU traffic from the links between EO1 and the STP. This is done on a per-link basis. For intercepted IAMs, an LNP database lookup is performed across a data network to determine if the Called Party Number (CdPN) is ported.

(3) The database returns an LRN. For non-ported customers the LRN will be the same as the original CdPN. However, if the customer has ported the LRN will be different from the original CdPN.

(4) Assuming the DN is for a ported customer, the message interceptor will substitute the IAM CdPN=LRN, GAP=DN and FCI=LNP Query Done and retransmit the MSU to AT.

(5), (6), (7) When AT receives the IAM it will see a CdPN=LRN and attempt to complete the call to EO2. A speech path will be reserved across EO1-AT-EO2.

(8), (9) A message interceptor intercepts the MSU traffic from the links between STP and EO2. This is done on a per-link basis. The message interceptor performs a check on the FCI and GAP. Based on this, the message interceptor must substitute CdPN=GAP and remove the GAP and FCI. The call will then be delivered to EO2 for call processing and completion to party B via the normal translation processes.

LNP—Customer B Ported-Out From A's EO (FIG. 8)

Party A (EO1) is attempting to contact B who has ported from carrier 1 (EO1) to carrier 2 (EO3). The objective is to deliver the call to party B on EO3 using the original carrier 1 number. If B had not ported, the call between party A and B would be handled intra-switch and there would be no external SS7 signalling for call set-up.

The basis of the service is to detect all intra-switch calls to a ported number by provisioning a call forward number to the original subscriber number. The only exception is that the Numbering Plan Area (NPA) component of the number will have a unique assignment which will be reserved for intra-LATA (Local Access & Transport Area) LNP purposes. For this example, assume that this special NPA code is 777.

(1), (2) EO1 receives the DN and performs standard call-forwarding to the original dialled number with a special NPA code of 777 preceding the DN. An IAM is launched to the AT which acts as a special gateway for such types of call. A speech path is set-up between EO1 and AT.

(3), (4) A message interceptor intercepts the MSU traffic from the links between STP and AT. This would be done on a per-link basis. An LNP database lookup is now performed across a data network to determine if the Called Party Number (CdPN) is ported.

(5) The database returns an LRN. For non-ported customers the LRN will be the same as the original CdPN. However, if the customer has ported the LRN will be different from the original CdPN.

(6) Assuming the DN is for a ported customer, the message interceptor will substitute the IAM CdPN= LRN, GAP=DN (with the correct LATA NPA code) and FCI=LNP Query Done, and retransmit the MSU to AT.

(7), (8) When AT receives the IAM it will see a CdPN= LRN and attempt to complete the call directly to EO3. A speech path will be reserved across EO1-AT-EO3.

(9) When the IAM arrives at the recipient EO3, a check is performed on the FCI and GAP. Based on this, EO3 must substitute CdPN=GAP and perform a lookup on the GAP to establish the physical connection to the CPE.

LNP—Customer B Ported-Out (FIG. 9)

FIG. 9 shows how the aforesaid second approach to service implementation can be applied to the situation which was dealt with in FIG. 6 by using the first approach to service implementation. In this second approach, the message interceptor is dedicated to modifying the DPC and an adjunct is reserved for performing the LRN translations. The benefit of this approach is that we can re-route messages to standard IN elements for call processing. As will be seen, this approach requires the message interceptor and adjunct to access a shared database.

Party A (EO1) is attempting to contact B who has now ported from carrier 1 (EO2) to carrier 2 (EO3). The objective is to deliver the call to party B on EO3 using the original carrier 1 number.

(1) EO1 simply launches an IAM to EO2 based on the DN received from party A. A speech path is set-up between EO1 and EO2.

(2), (3) A message interceptor intercepts the MSU traffic from the links between EO1 and the STP. This would be done on a per-link basis. An LNP database lookup is now performed across a data network to determine if the Called Party Number (CdPN) is ported. If the DN is a ported number, a copy of the IAM is stored in a shared database and the DPC of the IAM changed to that of the LNP adjunct processor. If the DN is a non-ported number the call proceeds as normal.

(4), (5), (6) As the original DPC of this MSU was corrupted by the message interceptor, the LNP adjunct must access the shared database to recall the original DPC in order to determine the correct destination for this MSU (i.e. EO2).

(7), (8), (9) The LNP adjunct now performs an LNP database lookup to perform the LRN translations IAM CdPN=LRN, GAP=DN and FCI=LNP Query Done. The IAM is then retransmitted to EO2.

(10)–(12) When EO2 receives the IAM it will see a CdPN=LRN and attempt to complete the call via an Access Tandem. A speech path will be reserved across EO1-EO2-AT-EO3.

(13) When the IAM arrives at the recipient EO3, a check is performed on the FCI and GAP. Based on this, EO3 must substitute CdPN=GAP and perform a lookup on the GAP to establish the physical connection to the CPE.

LNP—Customer B Ported-Out—Release Message Loopback (FIG. 10)

Although the foregoing methods of providing LNP have the advantage of avoiding the need to update the originating switch, they suffer from the disadvantage that they may consume more trunk resources than strictly necessary. This is because a call to a ported number may first be routed to the wrong destination switch. In order to overcome this drawback, the message interceptor can be arranged to generate a message similar to the enhanced release message already described in respect of one form of the call dropback method for LNP provision. More particularly, the message interceptor carries out a check on each received IAM to determine if it relates to a ported number and if it does, the relevant LRN is returned to the originating switch in an enhanced released message. The mechanism used to direct the enhanced release message back to the originating switch is to swap the destination and source point codes of the received IAM and forward it as an enhanced release message so that the next signalling point encountered by the message (generally an STP) will route the message back to the originating switch. This switch then deallocates the trunk initially allocated for the call and then tries again using the LRN returned in the enhanced release message as the called party number. The new IAM sent out by the switch has its FCI set to indicate to the message interceptor that a lookup has already been done on the message so the interceptor will just pass it on.

The advantage of this approach as compared to the standard call dropback method is that it minimises the post-dial delay experienced by the caller before being connected.

FIG. 10 illustrates the looping back by the message interceptor of an enhanced release message for the same situation as shown in FIG. 6, namely Party A (EO1) is attempting to contact B who has now ported from carrier 1 (EO2) to carrier 2 (EO3). As before, the objective is to deliver the call to party B on EO3 using the original carrier 1 number.

(1) EO1 starts by launching an IAM to EO2 based on the DN received from party A. A speech path is set-up between EO1 and EO2 (shown dashed in FIG. 10 because it is taken down before call completion).

(2) A message interceptor intercepts the MSU traffic from the links between EO1 and the STP. This is done on a per-link basis. For each IAM detected, unless the IAM already has its FCI set to Query Done, an LNP database lookup is performed across a data network to determine if the Called Party Number (CdPN) is ported.

(3) The database returns an LRN. For non-ported customers the LRN will be the same as the original CdPN. However, if the customer has ported the LRN will be different from the original CdPN.

(4) Assuming the DN is for a ported customer, the message interceptor will modify the IAM to an enhanced release message including the LRN and will swap the source and destination point codes before retransmitting the MSU to the STP.

(5) The STP loops the enhanced release message back to EO1 which deallocates the trunk to EO2.

(6),(7) EO1 now sends out a new IAM with the CdPN set to the LRN received in the enhanced release message, GAP set to DN and FCI set to Query Done. A speech path is reserved between EO1 and the Access Tandem. The message interceptor on receiving the IAM recognises that the FCI is set to Query Done so it simply passes on the IAM to the STP.

(8),(9) The IAM is passed via the Access Tandem to EO3 and a speech path will be reserved between AT and EO3.

(10) When the IAM arrives at the recipient EO3, a check is performed on the FCI and GAP. Based on this, EO3 must substitute CdPN=GAP and perform a lookup on the GAP to establish the physical connection to the CPE.

Figure 11:
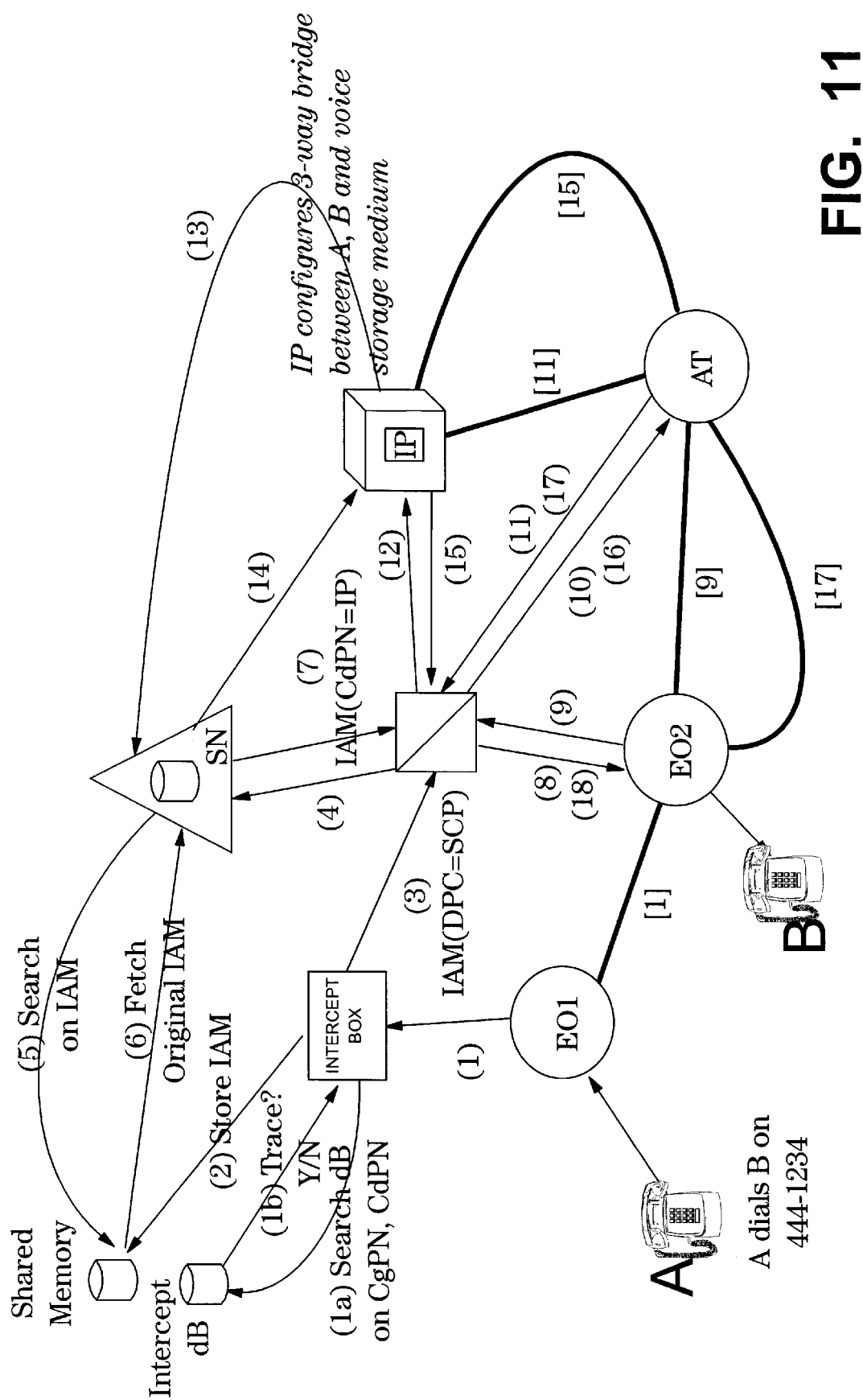
FIG. 11 is a diagram showing the operations involved in implementing automated call interception, in a sixth embodiment of the invention.

Automated Call Intercept (FIG. 11)

The next service to be described provides an automatic method for intercepting call attempts from a list of subscribers. The proposed service will seamlessly intercept and record (via an Intelligent Peripheral—IP) all call attempts from users held in a secure agency database. Service implementation involves the aforesaid second approach though, of course, the first approach would also be possible.

An Intelligent Peripheral platform with appropriate interfaces is used in this embodiment. The call intercept feature can be activated on either the Calling Party or Called Party numbers and based on time of day (if required).

(1),(1a),(1b) A call attempt by a targeted user will be progressed by the EO as normal. A message interceptor will intercept the IAM which performs a search of the intercept database using the CgPN or CdPN (etc.). If the call is NOT on the intercept list, the call will be routed to the CdPN in the usual way.

(2), (3) However, if an intercept match is found, the DPC of the IAM will be changed to route the call to an adjunct or Service Node (SN). The original IAM is stored in a shared database such that the original DPC can be recovered when the call must be completed to the intended DPC (EO2).

(4–7) At the SN the CdPN will be modified to direct the call to an IP (which could be owned by an authorized agency) via EO2. The original IAM will be fetched from the shared database to determine the DPC for completing the call.

(8–12) As the IP will be a shared resource, it is likely that calls must be routed via an access tandem AT. Hence, EO2 will forward the call to AT and subsequently onto the IP. A continuous speech path will now be reserved between EO1-EO2-AT-IP (see references 1, 9, 11 in square brackets).

(13), (14) Having terminated the A-leg of the call, the IP must then establish the original CdPN to which the call should be completed (B-leg). This information can be retrieved from the adjunct using either Advanced Intelligent Network (AIN) or some variant protocol. (Note: Some ISUP implementations have a diverted number field which the adjunct could use to store the original CdPN).

(15–18) Having determined the original CdPN, the IP will originate an IAM with CgPN set to the original calling party number A (Note: In case CLASS—Custom Local Area Signalling Service—services are active) in order to complete the B-leg of this call. The IAM will be delivered to EO2 based on the CdPN via an access tandem. Speech paths for the B-leg will be allocated in the order IP-AT-EO2 (see references 15, 17 in square brackets).

Once the call is answered, the IP can use a 3-way bridge to provide a continuous speech path between A and B, whilst activating a voice peripheral to record the call. All of this would happen seamlessly. The conversation could be reviewed in real-time, or the recorded message can be voice mailed to the interested party. Many options exist for the review and notification (i.e. Voice-to-Text and then E-mail, or Paging, etc. . . . ).

Figure 12:
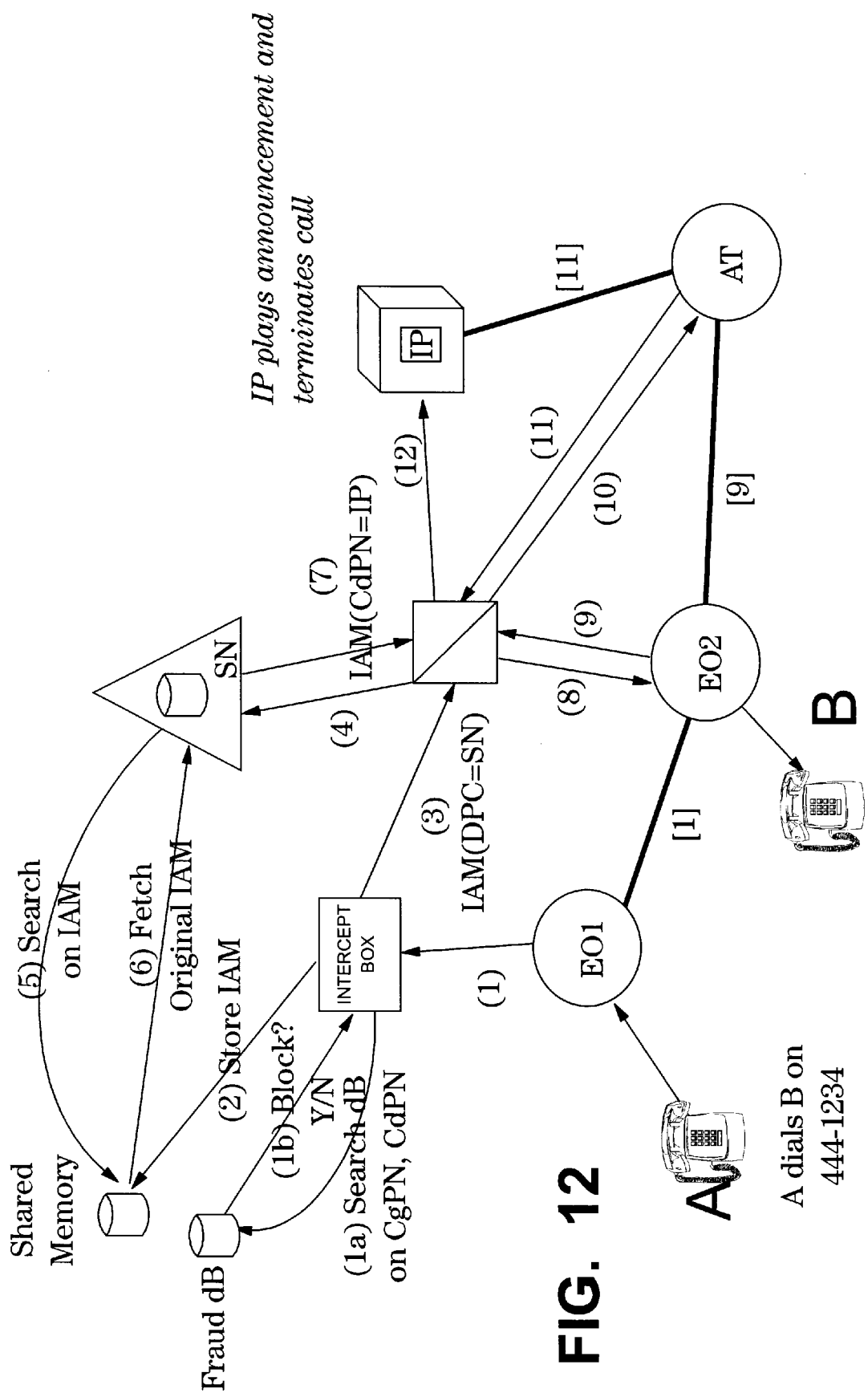
FIG. 12 is a diagram showing the operations involved in implementing automated fraudulent call interception, in a seventh embodiment of the invention.

Call Intercept—Fraud (FIG. 12)

This service provides an automatic method for intercepting call attempts from a list of fraudulent subscribers. The service will seamlessly intercept call attempts to or from users held in a fraud database. The information in this database could be updated in real-time.

An Intelligent Peripheral platform with appropriate interfaces is used in this embodiment. The call intercept feature can be activated on either the Calling Party or Called Party numbers and based on time of day (if required).

(1),(1a),(1b) A call attempt involving a fraudulent user will be progressed by the EO as normal. A message interceptor will intercept the IAM which performs a search of the fraud database using the CgPN or CdPN. If the call is NOT on the fraud list, the call will be routed to the CdPN in the usual way.

(2), (3) However, if an intercept match is found, the DPC of the IAM will be changed to route the call to an adjunct or SN. The original IAM is stored in a shared database such that the original DPC can be recovered when the call must be completed to the intended DPC (EO2).

(4–7) At the SN the CdPN will be modified to direct the call to an IP via EO2. The original IAM will be fetched from the shared database to determine the original DPC for completing the call.

(8–12) As the IP will be a shared resource, it is likely that calls must be routed via an access tandem AT. Hence, EO2 will forward the call to AT and subsequently onto the IP. A continuous speech path will now be reserved between EO1-EO2-AT-IP (see references 1, 9, 11 in square brackets).

On receiving the IAM, the IP can then play an announcement to the calling party based on the CgPN or CdPN. The IP can extract the original CdPN from the diverted address field.

- - - If the CgPN is the fraudster the IP could play ". . . you are currently barred from using the network".

- - - If the CdPN is that of the fraudster the IP could play ". . . you are currently calling a barred user".

The Message Interceptor

The message interceptor can be of the general form described in EP-A-0 669 771 in which a signalling link is effectively split into two links by the interceptor, the interceptor operating independent link-level protocol engines for exchanges with the two ends of the interrupted link. A message interceptor of this form whilst effective, is relatively complicated. A simpler form of message interceptor will now be described below with reference to FIGS. 13, 14 and 15.

Figure 13:
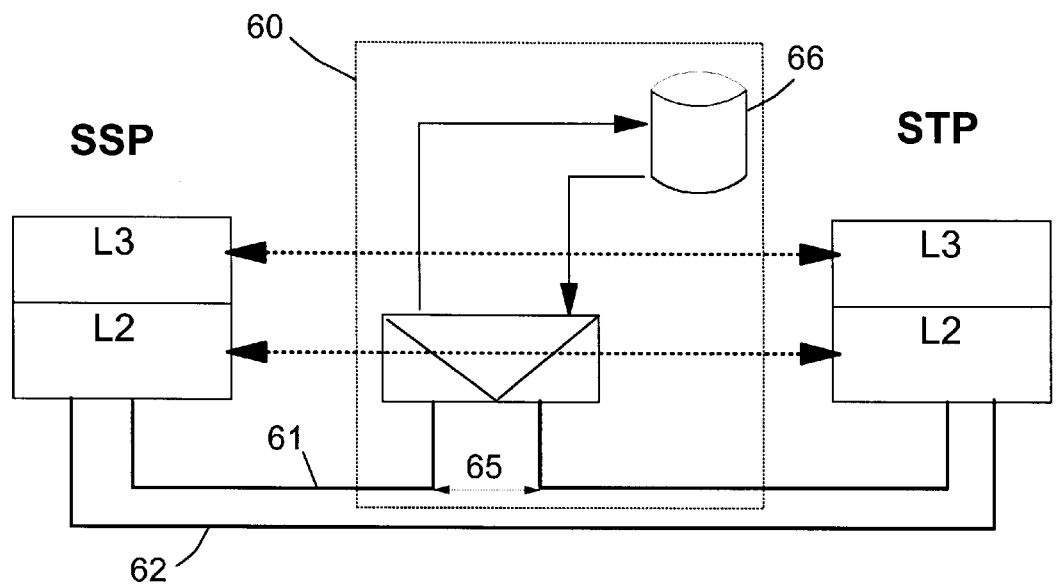
FIG. 13 is a diagram showing the operational placement of the message interceptor.

FIG. 13 illustrates the general disposition of a message interceptor 60 in one channel 61 of a bi-directional link between an SSP and an STP, this channel 61 passing messages from the SSP to the STP. Messages on the channel 61 are routed through the message interceptor 60 and in effect enter a delay pipe subjecting them to a delay $T_{pmsu}$ (see FIG. 14 which depicts both a message P flowing from SSP to STP along the channel 61 and a return message Q flowing in the opposite direction on the channel 62 which does not pass through the interceptor 60 so there is no delay $T_{pmsu}$ in this channel).

Figure 14:
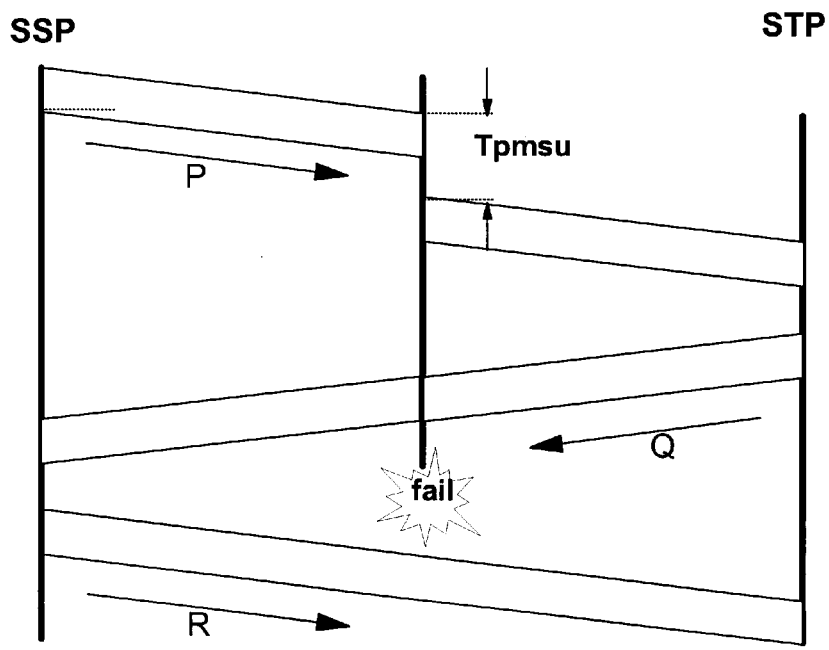
FIG. 14 is a time diagram illustrating the delay $T_{pmsu}$ introduced by the message interceptor.

A bypass relay arrangement 65 permits the interceptor 60 to be bypassed in fault conditions and in this case there will, of course, be no delay $T_{pmsu}$ in messages passing along the channel 61 (see message R in FIG. 14).

A key feature of the message interceptor is that it does not modify MTP Level 2 state-based protocol procedures viz.

backward error correction and flow control; it may, however, modify error checking and delimitation procedures which are stateless transformations.

The act of switching the relay arrangement 65 to bypass the interceptor 60 in the event of failure will be seen as bit errors which are corrected by level 2 backward error correction procedures in the STP and SSP. Thus the SSP and STP will generally remain in synchronism in the event of failure of the interceptor 60.

During normal operation of the message interceptor, as messages pass through the interceptor they are examined by comparing their type and the values of particular parameters with service trigger condition data to see if service implementation action is required; if it is, then the message concerned will be modified. As already mentioned, generally at least certain of the trigger condition data will be stored in a database 66 (possibly on an external server) though where appropriate a local cache memory may be provided of sufficient size to hold the database.

FIG. 15 is a functional block diagram of the message interceptor 60. The message interceptor comprises the following units:

Relays 65A, 65B These are the bypass (or pass-thru) relays for bypassing the interceptor when non-operational. The relays are controlled by a supervision unit 71 (see below).

Clock recovery unit 70 This unit recovers clocking information from the line 61 to synchronise operation of the units of the interceptor (in particular, units 72 and 74) with the line 61.

Delimitation, alignment detection and error detection (receive) unit 72 This unit serves to read in messages from the line 61-in; to this end, the unit 72 carries out the following functions:

acquires MTP L2 message frames de-limited by flags and strips bits inserted for data transparency;

checks each frame meets MTP L2 criteria for frame length and that the CRC-16 check is correct; such frames are tagged as 'good';

traffic which fails the above criteria is tagged as 'errored';

in either case traffic is appended to a delay pipe 73 (see below) an octet at a time.

Delay Pipe 73 As already indicated, the intercepted messages are effectively passed through a delay pipe; in practice, this "pipe" is implemented by storing the messages in known memory locations and using pointers to provide a delay pipe type function.

Delimiter insert, mimic alignment and error check insert (transmit) unit 74 This unit serves to output messages from the delay pipe 73 onto the line 61-out; to this end, the unit 74 carries out the following functions:

delimits frames with flags;

inserts stuffed bits for data transparency;

calculates the CRC-16 check for the frame; appends the CRC-16 check to frames tagged as 'good'; appends the ones complement of the CRC-16 check to frames tagged as bad;

tracks the alignment of the receiver; if an event occurred which caused the receiver to enter octet counting mode (long frame, abort, short frame) then it is replicated by the transmitter.

Timestamping Unit 77 Message frames are timestamped on receipt of the first octet, the timestamp register being driven by the recovered clock information from the unit 70. A watchdog timer checks if the timestamp register is running and instructs the supervision unit 71 (see below) to place the relays 65A, 65B in pass-thru (bypass) mode if no clock is found.

Lookup candidate selection unit 75 This unit has ISUP protocol knowledge to allow it to detect particular message types (notably, but without limitation, IAMs) and to extract the parameter values of interest (notably, but without limitation, called party numbers). The unit 75 will initiate a lookup in the database 66 (FIG. 13) against the extracted parameter value as soon as the latter is available. Lookups can be distributed between servers e.g. by using the first digit of a local number to decide which server to use. Fault tolerant lookups are also feasible by effecting multicast lookup to primary and secondary servers. Lookups may be transmitted via a LAN to a server or may be directed to a cache on board the interceptor. Only messages tagged as good are examined by the unit 75, those tagged as bad being passed through the interceptor unchanged.

Substitute lookup responses Unit 76 This unit effects any required modification to a message, either by changing particular parameter values or by changing the destination point code of the message. If the changed parameter is a variable length one (or indeed, if optional parameters are added) then the change may cause the message frame length to increase. It is the responsibility of the unit 76 to make any required adjustments to the length indicators and to the messages' internal pointers.

Bandwidth balance Unit 78 This unit checks if the timestamp of the frame at the head of the delay pipe 73 was received at a time interval $T_{pmsu}$ (the pipe delay constant) before the time currently shown in the timestamp register. Let us call this difference $T_{diff}$. The unit 78 endeavours to keep the delay through the interceptor as constant as possible to prevent excessive jittering of the link throughput which could make queuing delays at the STP erratic and subsequent modelling difficult. The unit 78 operates according to the following rules:

if the difference is equal to or slightly greater than $T_{pmsu}$ then the frame is passed to the transmit unit 74;

if the difference is significantly larger than $T_{pmsu}$ then the delay pipe has grown owing to an increase in length of the preceding frame which in turn was caused by a lookup substitution. Several strategies are available to recover bandwidth and these are applied in the following order:

1. Use gaps between frames: if the time difference between the timestamps of the first and second messages (frames) in the queue is greater than the time it would take to transmit the first message in the queue, then the first message is passed to the transmit chain. The net effect on the link is a delay in receiving the message equal to the time it took to transmit the octets added to the previous message.

2. Delete a FISU: if there is a FISU at the head of the queue then it can be deleted without being transmitted, without affecting L3 data flow, because all the following conditions hold:

(a) FISUs don't transfer L3 data;

(b) the FSN information is only significant for MSUs;

(c) the FIB indication is only significant for MSUs;

(d) the BSN acknowledgement is caught by the BSN of the next frame;

(e) the BIB indication is replicated in the BIB of the next frame; and (f) a frame must be following (thus guaranteeing (d) and (e)), because strategy 1 above failed.

3. Delete FISU and shift back: if an FISU can be found in the queue then it can be deleted according to the procedure above. The timestamps of all frames which precede the deleted FISU should be incremented by the time it would take to transmit the FISU.

4. Delete an MSU: by deleting an MSU at the head of the queue, bandwidth for the preceding frame will be allocated. The MTP flow control procedure at the STP side of the message interceptor will then detect a missing sequence number and request re-transmission.

Supervision unit 71 This unit monitors both the incoming and outgoing streams and if any of the situations listed below occurs then the relays 65A, 65B are returned to pass-thru mode:

1. Error conditions are not passed through
2. Frames experience a delay significantly less than or greater than $T_{pmsu}$
3. A sequence of two or more frames arriving on the incoming stream has two or more frames deleted on the outgoing stream
4. An ISUP message encoding rule has been broken on the traffic on the outgoing stream
5. An excessive number of re-transmitted frames is received on the incoming stream. (This may be due to a hardware failure in the transmitter so the unit should be taken out of service as a precautionary measure).

It will be appreciated that the part of the message interceptor responsible for message input and output, the delay pipe, service trigger checking, and message modification, can be replicated and arranged in parallel to provide protection of the link during board swaps etc. The message modification portion of the interceptor may be replicated by itself with the replicated portions being arranged in parallel to increase modification throughput.

The message interceptor 60 is described in further detail in our copending UK patent application no. 96 15 998.3.

Variants

It will be appreciated that many variants are possible to the above described embodiments. Thus, for example, rather than intercepting the signalling messages as they pass along a link, they could equally be intercepted as they pass through an STP; the mechanisms involved in intercepting messages at an STP are very similar to those described in EP-A-0 669 771.

It will further be appreciated that although the present invention has been described above in relation to implementation of number portability and call intercept services, the above-described inventive concepts can be applied to the implementation of other services that can be triggered off the detection of circuit-related or other signalling messages. In particular, the message interceptor described with reference to FIGS. 13 to 15 can be used to implement many different services. Furthermore, the generation and loopback of a release message by the message interceptor on the basis of particular selection criteria being satisfied, can be applied to other services additional to LNP; in such cases, the returned message need not be restricted to a release message but could be any type appropriate to the application concerned.

Although the above description relates to an SS7 signalling network, it will be appreciated that the message interceptor and the method of the invention could be arranged to operate with other, similar, signalling networks. In particular, it is possible to vary the physical and link levels from those generally specified for an SS7 network. Thus the message interceptor and method of the invention may be applied to a signalling network in which the basic link transport mechanism is based on ATM technology, the higher levels still being SS7 conformant.

We claim:

1. A method of providing a service in respect of a call in a switched telecommunications system that comprises a bearer network with a plurality of switching points for setting up calls through the bearer network, and a signalling system with a plurality of links by means of which circuit-related control messages can be passed between originating and destination switching points for regulating call setup and release, said control messages comprising control-message source and destination data and call-related parameters, said method comprising the steps of:

a) intercepting said circuit-related control message;

b) for each intercepted control message, accessing service trigger data to ascertain whether service implementation action is required in respect of the call associated with the control message;

c) where step (b) indicates that service implementation action is required, modifying at least one of said call-related parameters of said control message whereby to effect at least part of the required service implementation action, and replacing said destination data of the control message with said control-message source data; and d) forwarding on towards the destination switching point the intercepted control messages over the signalling network, the originating switching point taking further service implementation action based on the modified said at least one parameter upon receipt back of said control message.

2. A method according to claim 1, wherein said control messages are of various types and include (comprise) a message-type indicator, said service trigger data indicating for which control-message types and parameter values service implementation action is required, and step (c) involving modifying said message type indicator.

3. A method according to claim 2, wherein one said message type is an Initial Address message including a called-number parameter holding called number data, and said service to be provided is local number portability; said service trigger data indicating that local-number-portability service implementation action is required for control messages of said Initial Address type that have particular values of said called-number parameter; said method involving:

in step (b), comparing the type and called number data of each intercepted control message with the service trigger data to ascertain whether said local number portability service is to be implemented, said accessing of said service trigger data returning a location routing number indicative of the switching point from which the called party currently depends;

where step (b) ascertains that said local number portability service is required, carrying out step (c) to:

store the location routing number in the control message;

set the message type indicator to a release message type; and swap the source and destination data;

a further step, for each control message received back at the originating switching point as a release message following modification in step (c), of sending out a new control message of the Initial Address Message type with destination data therein set in dependence on said location routing number, said new control message having called number data therein set to said location routing number and including both the original called number and a flag indicating that the called number data is a location routing number.

4. A method of providing a service in respect of a call in a switched telecommunications system that comprises a bearer network with a plurality of switching points for setting up calls through the bearer network, and a signalling system with a plurality of links by means of which circuit-related control messages can be passed between originating and destination switching points for regulating call setup and release, said control messages comprising control-message destination data and call-related parameters, said method comprising the steps of:

(a) intercepting said circuit-related control messages;

(b) for each intercepted control message, accessing service trigger data to ascertain whether service implementation action is required in respect of the call associated with the control message;

(c) where step (b) indicates that service implementation action is required, modifying the said destination data of the control message to route said control message to a service control function, said call-related parameters of the control message being left unmodified; and (d) forwarding on the intercepted control messages over the signalling network towards the destination switching point.

5. A method according to claim 4, wherein step (c) further involves storing at least a part of the control message for lookup by said service control function, the stored said at least a part of the control message including the unmodified destination data whereby to enable said service control function to ascertain the original destination of the control message.

6. A method according to claim 5, wherein said control messages are of various types and comprise a message-type indicator, control-message source and destination data, and call-related parameters; and wherein one said message type is an Initial Address Message including a called-number parameter holding called number data and said service to be provided is local numbers portability, said service trigger data indicating that local-number-portability service implementation action is required for control messages of said Initial Address type that have particular values of said called-number parameter; said method further involving:

in step (b), comparing the type and called number data of each intercepted control message with the service trigger data to ascertain whether said local number portability service is to be implemented;

where step (b) ascertains that said local number portability service is required, carrying out step (c) to route the control message to said service control function and to store at least a part of the control message including the unmodified destination data;

said method including the following further steps for each message received at said service control function following modification of its destination data in step (c);

looking up from said service control function, the stored said at least a part of the control message whereby to enable said service control function to ascertain said unmodified destination date of the control message;

changing the control message by:

setting the called number data in the control message to said location routing number, storing the original called number in the control message, setting a flag in the control message to indicate that the called number data is a location routing number; and setting the destination data to said unmodified destination data; and sending on the changed control message towards said destination switching point.

7. A method according to claim 5, wherein said control messages are of various types and comprise a message-type indicator, control-message source and destination data, and call-related parameters; and wherein one said message type is an Initial Address Message including a called-number parameter holding called number data, and said service to be provided is call interception, said service trigger data indicating that call-interception service implementation action is required for control messages of said Initial Address Message type that have particular values of said called-number parameter; said method further comprising:

in step (b), comparing the type and party-number data of each intercepted control message with the service trigger data to ascertain whether said call interception service is to be implemented;

where step (b) ascertains that said call interception service is required, carrying out step (c) to route the control message to said service control function and to store at least a part of the control message including the unmodified destination data;

said method including the following further steps for each control message received at said service control function following modification of its destination data in step (c):

looking up from said service control function the stored said at least a part of the control message whereby to enable said service control function to ascertain said unmodified destination data of the control message;

changing the control message by setting the called number data in the control message to an IP number indicative of an intelligent peripheral to which the call is to be routed, and setting the destination data to said unmodified destination data, and sending on the changed control message.

8. A method of providing a call interception service in respect of a call in a switched telecommunications system that comprises a bearer network with a plurality of switching points for setting up calls through the bearer network, and a signaling system with a plurality of links by means of which circuit-related control messages can be passed between the switching points for regulating call setup and releases, said control messages being of various types and comprising a message-type indicator, control-message source and destination data, and call-related parameters, with one said message type being an Initial Address Message including party-number data comprising at least called number data, said method comprising the steps of:

(a) intercepting said circuit-related control messages;

(b) for each intercepted control message, accessing service trigger data to ascertain whether call-interception service implementation action is required in respect of the call associated with the control message, said service trigger data indicating that call-interception service implementation action is required for control messages of said Initial Address Message type that have particular values for at least part of said party-number data;

(c) where step (b) indicates that service implementation action is required, setting the called number data in the control message to an IP number indicative of an intelligent peripheral to which the call is to be routed; and (d) forwarding ont the intercepted control messages over the signalling network.

9. A method according to claim 8, wherein said service trigger data indicates that service implementation action is required for control messages of said Initial Address type that have particular values of said called party number.

10. A method according to claim 8, wherein said party-number data of said Initial Address messages include calling number data, said service trigger data indicating that service implementation action is required for control messages of said Initial Address type that have particular values of said calling party number.

11. A method according to claim 8, wherein said call interception service further involves providing for the tapping of the corresponding call at said intelligent peripheral and seeking to complete the call from the intelligent peripheral to the called party.

12. A method according to claim 8, wherein said call interception service further involves playing a voice message to the calling party from said intelligent peripheral without completing the call to the called party.

* * * * *